United States Patent [19]

Tanahashi

[11] Patent Number: 4,816,985
[45] Date of Patent: Mar. 28, 1989

[54] APPARATUS FOR CONTROLLING AN ALTERNATING CURRENT POWER SUPPLY

[75] Inventor: Tooru Tanahashi, Inazawa, Japan

[73] Assignee: Mitsubishi Denki Kabushiki Kaisha, Japan

[21] Appl. No.: 156,754

[22] Filed: Feb. 18, 1988

[30] Foreign Application Priority Data

Feb. 19, 1987 [JP] Japan .................. 62-36232

[51] Int. Cl.$^4$ ............................. H02M 7/04
[52] U.S. Cl. ........................ 363/81; 363/37; 363/87
[58] Field of Search .............. 363/35, 37, 79, 81, 363/87

[56] References Cited

U.S. PATENT DOCUMENTS

| 3,832,620 | 8/1974 | Pollard | 363/87 |
| 4,210,956 | 7/1980 | Watanabe | 363/37 |
| 4,328,454 | 5/1982 | Okuyama et al. | 318/803 |
| 4,330,815 | 5/1982 | Konishi | 363/35 |
| 4,490,780 | 12/1984 | Nondahl | 363/87 |
| 4,494,179 | 1/1985 | Inokuchi et al. | 363/35 |
| 4,626,978 | 12/1986 | Thouvenin | 363/79 |

FOREIGN PATENT DOCUMENTS 60-12568  1/1985  Japan .

Primary Examiner—Patrick R. Salce
Assistant Examiner—J. Sterrett
Attorney, Agent, or Firm—Leydig, Voit & Mayer

[57] ABSTRACT

An apparatus for controlling power conversion from alternating current (A.C.) to direct current (D.C.) by a converter has a D.C. voltage detector connected to receive a D.C. output of the converter for detecting the D.C. side voltage of the converter, a phase detector connected to an A.C. power source for detecting the phase of the A.C. power source, and calculating means for making a first calculation of a first current command value based on the output of the D.C. voltage detector, a second calculation of a phase angle of the A.C. power source voltage based on the first current command value, and a third calculation of second current command values based on the phase angle of the A.C. power source voltage and the output of the phase detector.

2 Claims, 6 Drawing Sheets

APPARATUS FOR CONTROLLING AN ALTERNATING CURRENT POWER SUPPLY

BACKGROUND OF THE INVENTION

The present invention relates to an apparatus for controlling an elevator that is driven by an induction motor.

FIGS. 8 and 9 show a prior-art apparatus for controlling an A.C. elevator disclosed, for example, in Japanese Utility Model Application Laid-open No. 60-12568. FIG. 8 is a circuit diagram of a block diagram of the control apparatus, and FIG. 9 is a vector diagram.

In FIGS. 8 and 9, numeral 1 designates a three-phase A.C. power source. 2 denotes A.C. reactors connected to the A.C. power source 1. Numeral 3 indicates a converter which converts an A.C. into a D.C. by a pulse width modulation. The converter 3 has transistors connected at its input side to the A.C. reactors 2 to receive input currents and diodes in parallel with the transistors. Symbols 4A to 4C depict current detectors for detecting the input currents of the converter 3. Numeral 5 designates D.C. buses connected to the output side of the converter 3, numeral 6 denotes a D.C. voltage detector for detecting a voltage between the D.C. buses 5. Numeral 7 indicates a reference voltage setter. Numeral 8 depicts a voltage control amplifier, numeral 9 designates a three-phase sinusoidal wave oscillator. Symbols 10A to 10C denote multipliers. Symbols 11A to 11C indicate current control amplifier. Numeral 12 depicts a saw-tooth wave generator. Numeral 13 designates a comparator. Numeral 14 denotes a base driving circuit for producing a signal to the buses of the transistors of the converter 3. As will be shown, the D.C. buses 5, 5 are connected to an inverter constructed in the same manner as the converter 3, and a three-phase induction motor for hoisting an elevator is connected to the output side of the inverter.

The prior-art apparatus for controlling the A.C. elevator is constructed as described above, and the operation of the apparatus will be described herebelow.

The A.C. voltage from the A.C. power source 1 is converted by the converter 3 into D.C., which is, in turn, supplied to the inverter, and the voltage between the D.C. buses 5 and 5 is detected by the D.C. voltage detector 6. The voltage control amplifier 8 compares the D.C. voltage signal 6a with the output of the reference voltage setter 7 and generates a current command signal. The output of the voltage control amplifier 8 is multiplied by the multipliers 10A to 10C by the outputs of the sinusoidal wave generator 9, and sinusoidal current command signals are generated. The sinusoidal current command signals from the multiplier 10A to 10C are, in turn, applied to the current control amplifiers 11A to 11C. On the other hand, the outputs of the current detectors 4A to 4C are also applied to the current control amplifiers 11A to 11C. Thus, the current control amplifiers 11A to 11C calculate and amplify deviations between the current command signals of the outputs of the multipliers 10A to 10C and the outputs of the current detectors 4A to 4C, respectively. The outputs of the current control amplifiers 11A to 11C are then applied to the compartor 13. On the other hand, the output of the saw-tooth wave generator 12 is also applied to the comparator 13. Thus, the comparator 13 compares the outputs of the current control amplifiers 11A to 11C with the output of the saw-tooth wave generator 12, and generates pulse-width modulation signals. These pulse-width modulation signals are amplified by the base driving circuit 14, and, in turn, applied to the bases of the transistors of the converter 3 as base signals to control the converter 3, thereby controlling to maintain the voltage of the D.C. buses 5 constant.

The current command signals applied to the bases of the transistors of the converter 3 for controlling the converter 3 in FIG. 8 are sinusoidal. Accordingly, the input currents to the converters 3 also are sinusoidal, and the following vector equation is satisified.

$$Vin = Vac + jXI \tag{1}$$

wherein
Vin denotes an input voltage of the converter 3,
Vac denotes a voltage of the A.C. power source 1
I denotes an input current of the converter 3, and
X denotes an impedance of the AC reactor 2.

In order to improve the power factor, the input current I must be set in phase with the AC voltage Vac. At this time, as shown in FIG. 9, the A.C. voltage Vac crosses the voltage drop XI of the A.C. reactor 2. Therefore, the following equation is satisfied.

$$|Vin| = \sqrt{|Vac|^2 + |XI|^2} \tag{2}$$

Since the peak value of the input side voltage of the converter 3 cannot be raised to a value higher than the D.C. voltage Vd, it is necessary to select the D.C. voltage Vd to satisfy the following formula so as not to include harmonic components.

$$\sqrt{\frac{2}{3}} \; Vin < \frac{Vd}{2} \tag{3}$$

In order to control the phase of the input current I of the converter 3 in phase with that of the power source voltage VAC so as to reduce the harmonic wave components of the input current of the converter 3 and to improve the power factor in the prior-art apparatus for controlling the A.C. elevator, it is necessary to raise the input voltage of the converter 3 to a value indicated by an input voltage Vin1, when a load current is large, and to a value indicated by an input voltage Vin2, when the power source voltage is varied to a higher value. To this end, the prior-art apparatus has such drawbacks that the voltage of the D.C. buses 5 must be raised and high dielectric strength components must be employed.

SUMMARY OF THE INVENTION

The present invention has been made in order to solve the above drawbacks and problems and has for its object to provide an apparatus for controlling an A.C. powered elevator, which can reduce the harmonic wave components of an input current without raising the voltage of A.C. buses even if a load current increases.

Another object of the present invention is to provide an apparatus for controlling an A.C. powered elevator, which can, additionally, reduce the harmonic wave components of an input current without raising the voltage of D.C. buses even if the power source voltage is varied.

The apparatus for controlling power conversion from A.C. to D.C. by a converter according an embodiment of the present invention comprises a D.C. voltage detector connected to receive a D.C. output of the converter for detecting the D.C. side voltage of the converter, a phase detector connected to an A.C. power source for detecting the phase of the A.C. power source, and calculating means for making a first calculation of a first current command value based on the output of the D.C. voltage detector, a second calculation of the phase angle of the A.C. power source voltage based on the first current command value and a predetermined voltage value, and a third calculation of said current command values based on the phase angle of the A.C. power source voltage and an output of the phase detector.

The apparatus for controlling an A.C. elevator according to another embodiment of the present invention for achieving the another object of the invention comprises, in addition to the above, an A.C. voltage detector circuit for detecting the A.C. power source voltage to input the output of the A.C. voltage detector circuit to the calculating means instead of the predetermined value.

Since the phase angles of the A.C. power source voltage and the input current of the converter are calculated to determine the current command signal in the apparatus of the present invention, the phase of the input current of the converter is controlled in response in the amplitude of the input current so that the input voltage of the converter becomes substantially constant.

In another embodiment of the present invention, the A.C. power source voltage is introduced in the calculation of the phase angle. Therefore, the phase of the input current of the converter is controlled in response to the amplitude of the A.C. power source voltage so that the input voltage of the converter becomes substantially constant.

BRIEF DESCRIPTION OF THE DRAWINGS

In the drawings, the same symbols indicate identical or corresponding portions.

DESCRIPTION OF THE PREFERRED EMBODIMENTS

FIGS. 1 to 7 show an embodiment of the present invention.

Figure 1:
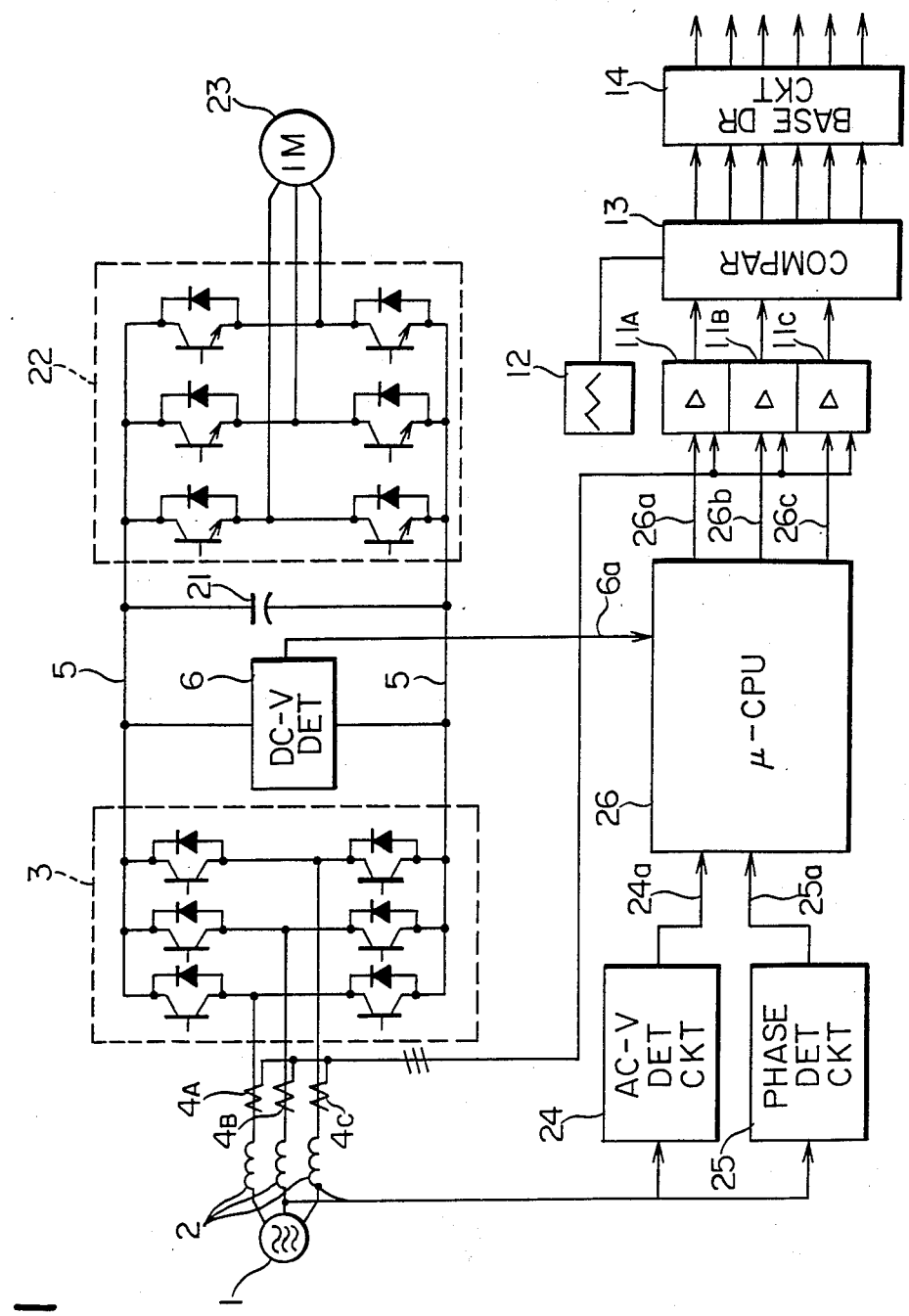
FIG. 1 is a block circuit diagram showing an embodiment of an apparatus for controlling an A.C. powered elevator according to the present invention.

Referring to FIG. 1, numeral 21 designates a smoothing condenser connected between D.C. buses 5 and 5. Numeral 22 denotes an inverter for converting a D.C. into a variable voltage variable frequency A.C. by pulse-width modulation, composed similarly to the converter 3. Numeral 23 indicates an induction motor for hoisting an elevator connected to the A.C. side of the inverter 22.

Figure 2:
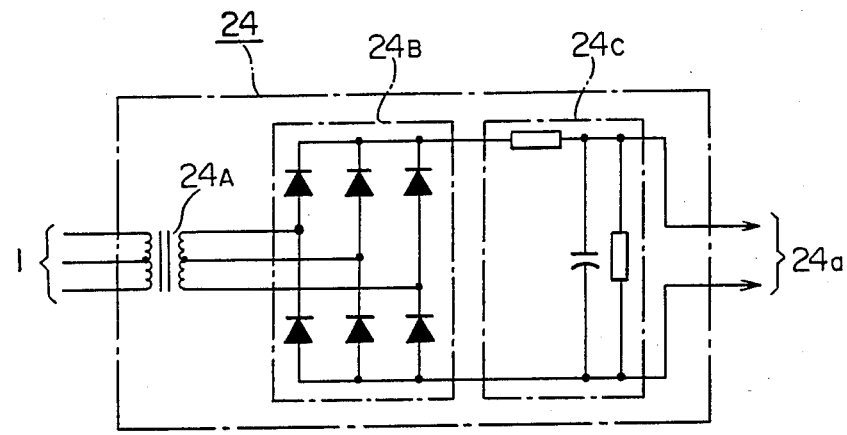
FIG. 2 is a circuit diagram showing an A.C. voltage detector.

Numeral 24 depicts an A.C. voltage detector for detecting the voltage of an A.C. power source 1 to produce an A.C. voltage signal 24a. The detector 24 has, as shown in FIG. 2, a step-down transformer 24A, a three-phase full-wave rectifier 24B formed of diodes and a filter circuit 2C including a condenser and resistors. Thus, the voltage of the A.C. power source 1 is stepped down by the step-down transformer 24A, rectified by the three-phase full-wave rectifier 24B, and smoothed by the filter 24C to produce an A.C. voltage signal 24a.

Figure 3:
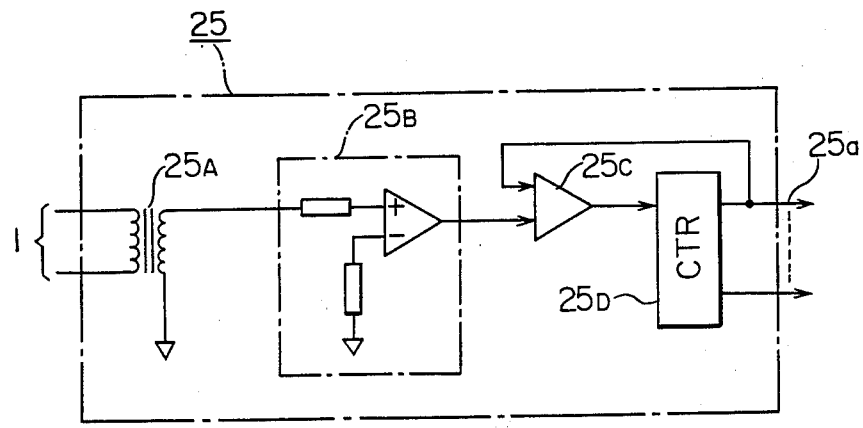
FIG. 3 is a circuit diagram showing a power source phase detector.

In FIG. 1, numeral 25 designates a power source phase detector circuit for detecting the phase angle of the A.C. power source 1. As shown in FIG. 3, the power source phase detector circuit has a step-down transformer 24A, a comparator 25B including an operational amplifier and resistors, a phase locked loop (hereinafter referred to as a "PLL") oscillator 25C and a counter 35D. Thus, the voltage of the A.C. power source 1 is stepped down by the step-down transformer 25A, the comparator 25B decides the polarity of the output of the step-down transformer 25A, and the output of the comparator 25B becomes a pulse. The PLL oscillator 25C varies the output pulse frequency in response to the phase difference of the outputs of the comparator 25B and the counter 25D. Then, the output of the counter 25D becomes a phase angle signal 25a synchronized with the phase of the A.C. power source 1.

Figure 4:
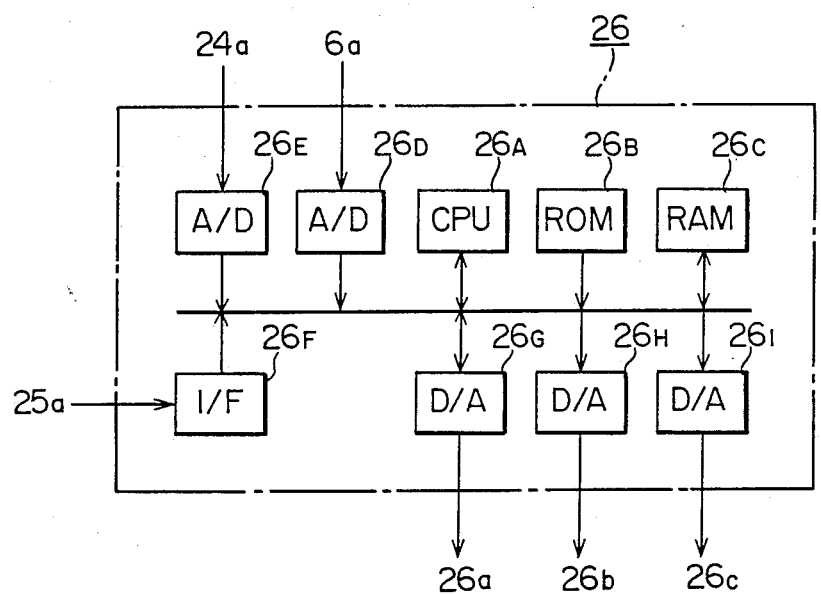
FIG. 4 is a block diagram of a microcomputer.

In FIG. 1, numeral 26 designates a microcomputer, which has, as shown in FIG. 4, a CPU 26A, a ROM 26B, a RAM 26C, analog-to-digital (hereinafter referred to as a "A/D") converters 26D, 26E, an interface (hereinafter referred to as a "I/F") circuit 26F and digital-to-analog (hereinafter referred to as a "D/A") converters 26G to 26I. The A/D converters 26D, 26E are respectively connected to the D.C. voltage detector 6 and the A.C. voltage detector 24, the I/F circuit 26F is connected to the power source phase detector 25, and the D/A converters 26G to 26I are respectively connected to current control amplifiers 11A to 11C.

Next, the operation of the embodiment described above will be described with reference to FIGS. 5 and 6, and the principle of the operation will be first described by referring to FIG. 5.

The cost of electric power is inversely proportional to the power factor. To reduce the cost of electric power, it is desirable to keep the power factor at the highest practicable value, such as 85% or higher. Thus, when harmonic wave components of the input current of the converter 3 are compared with the power factor, the input voltage of the converter 3 is lowered when the power factor of the input current is reduced in a range higher than the predetermined value, and the D.C. voltage can be thus decreased.

Figure 5:
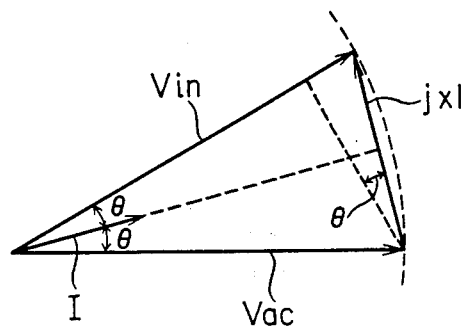
FIG. 5 is a vector diagram of voltages.

It is understood that the phase of the current is controlled so that the following equation is satisfied from FIG. 5 in order to maintain the input voltage of the converter 3 a value lower than a predetermined value irrespective of the variations in the amplitude of the load current and the voltage of the A.C. power source 1.

$$Vin = Vac \times \cos(2\theta) + XI \times \sin(2\theta) = Vcont \qquad (4)$$

wherein $\theta$ denotes the phase angles of the power source voltage and the input current.

When the equation (4) is modified, $$\cos(\phi + 2\theta) = V_{cont}/\sqrt{V_{ac}^2 + (XI)^2} \quad (5)$$

Here, $$\phi = \tan^{-1} XI/V_{ac} \quad (6)$$

and the $\theta$ can be obtained by the following equation.

$$\theta = \left(\cos^{-1}(V_{cont}/\sqrt{V_{ac}^2 + (XI)^2} - \phi) \times \frac{1}{2}\right) \quad (7)$$

Figure 6:
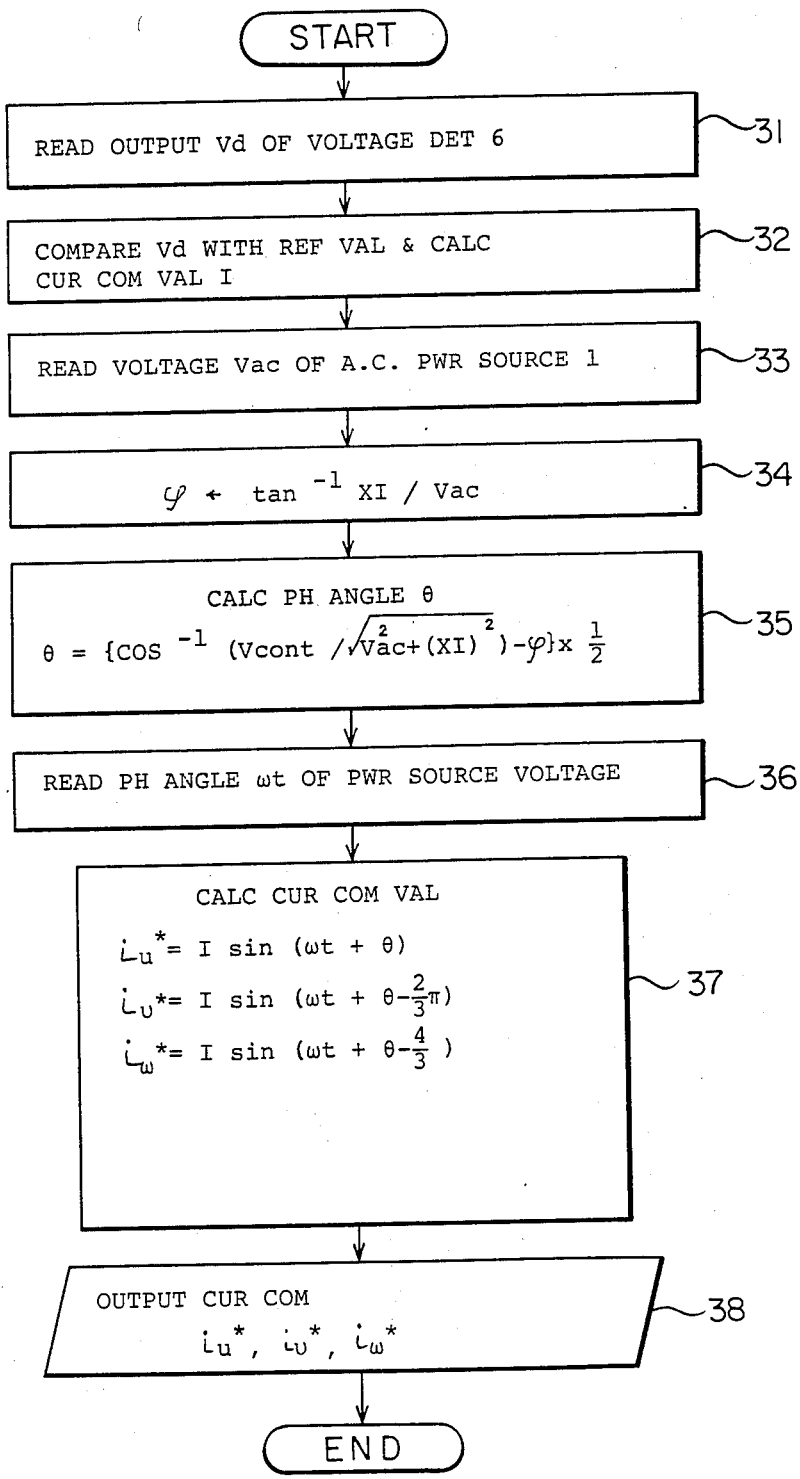
FIG. 6 is a flow chart showing the program of the microcomputer.

FIG. 6 is a flow chart for a program stored in the ROM 26B of the microcomputer.), the D.C. voltage Vd detected by the D.C. voltage detector 6 is read through the A/D converter 26D in step 31. The D.C. voltage Vd is compared with a reference value to calculate a current command value I in step 32. In step 33, the voltage Vac of the A.C. power source 1 detected by the A.C. voltage detector 24 is read through the A/D converter 26E. In step 34, $\phi = \tan^{-1} XI/V_{ac}$ is calculated by the equation (6). In step 35, the phase angle $\theta$ is calculated by the equation (7). In step 36, the phase angle $\omega t$ (wherein $\omega$ is an angular velocity, and t is a time) of the power source voltage detected by the power source phase detector 25 is read through the I/F 26F. In step 37, the current command values $i_u^*$, $i_v^*$ and $i_w^*$ are calculated.

$$i_u^* = I\sin(\omega t + \theta)$$

$$i_v^* = I\sin\left(\omega t + \theta - \frac{2}{3}\pi\right)$$

$$i_w^* = I\sin\left(\omega t + \theta - \frac{4}{3}\pi\right)$$

In step 38, the current command values $i_u^*$, $i_v^*$ and $i_w^*$ are respectively applied from the D/A converters 26G to 26I as outputs 26a to 26c to the current control amplifiers 11A to 11C.

The following operation is the same as that of the prior-art apparatus. The converter 3 is controlled, thereby maintaining the voltage of the D.C buses 5 constant. This voltage is smoothed by the smoothing condenser 21, supplied to the inverter 22 to be converted into variable voltage variable frequency voltage, and, in turn, supplied to the motor 23. Thus, the speed of the motor 23 is controlled. However, since this is not directly relative to the embodiment, the detailed description will be omitted.

Figure 7:
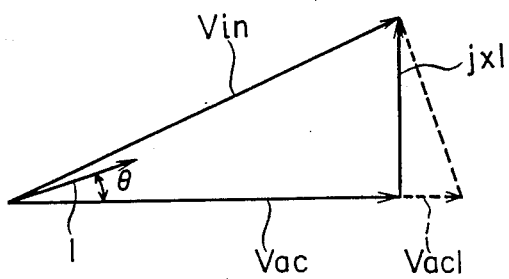
FIG. 7 is a vector diagram.
Figure 9:
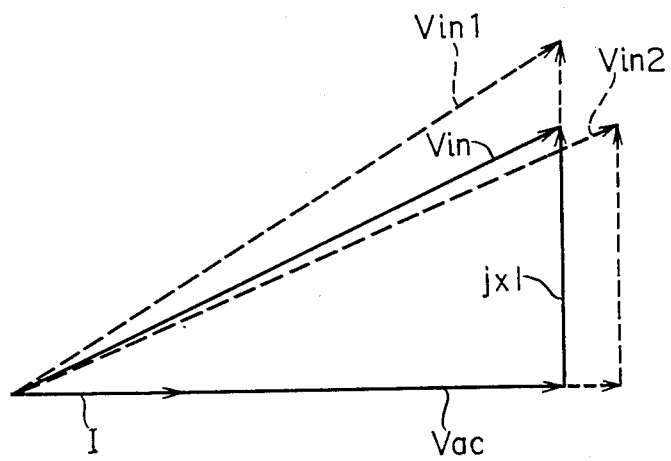
FIG. 9 is a vector diagram of the prior-art apparatus.
Figure 8:
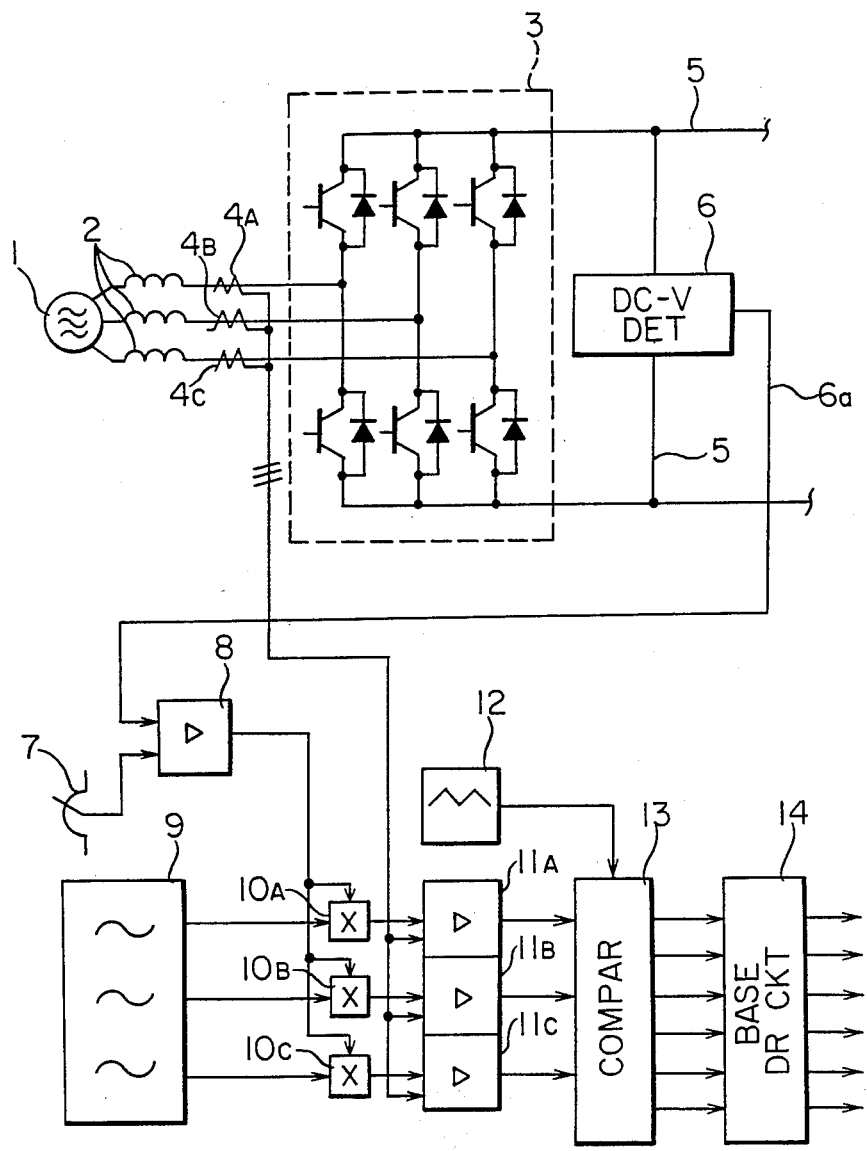
FIG. 8 is a block diagram of the essential portion of a prior-art apparatus for controlling an A.C. powered elevator.

When the voltage Vac of the A.C. voltage 1 is varied to increase to a voltage Vac1 higher than a rated voltage as shown in FIG. 7, the calculation after the step 34 is corrected. In the step 34, the phase angle $\theta$ corresponding to the voltage Vac1 is calculated, the voltage drop jXI is controlled as shown in FIG. 7 so that the input voltage Vin of the inverter 3 may not rise.

In the embodiment described above, the voltage detector 24 has been employed. However, when the variation in the voltage of the A.C. power source 1 can be ignored, it can be sufficiently useful even if the voltage detector 24 is not used. In this case, the A.C. voltage Vac read in the step 33 is processed as a constant value.

According to the present invention as described above, the phase of the input current is controlled in response to the amplitude of the input current so that the input voltage of the converter becomes substantially constant. Therefore, the dielectric strength of the components used in the main circuit can be reduced by setting the D.C. voltage to a lower value, thereby reducing the cost of construction of the apparatus. Even if the load is varied, the harmonic wave components of the input current can be reduced.

According to another embodiment of the present invention as described above, the A.C. power source voltage is employed in the calculation of the phase angle. Therefore, even if the A.C. power source voltage is varied, the D.C. voltage can be set to a lower value, and the harmonic wave components of the input current can be reduced.

What is claimed is:

1. An apparatus which controls the conversion of power from an alternating current (A.C.) power source to direct current (D.C.) by a converter with an A.C. input, a D.C. output, and a control input, the apparatus comprising:

a D.C. voltage detector having an input connected to the D.C. output of the converter and having an output;

a phase detector having an input connected to the A.C. power source and having an output; and calculating means connected to the output of the D.C. voltage detector and the output of the phase detector for making:

a first calculation of a first current command value based on the output of the D.C. voltage detector, a second calculation of a phase angle of the A.C. power source voltage based on the first current command value, and a third calculation of second current command values based on the phase angle of the A.C. power source voltage and the output of the phase detector, the calculating means being connected to provide the second current command values to the control input of the converter.

2. An apparatus as set forth in claim 1 further comprising an A.C. voltage detector having an input connected to the A.C. power source to detect A.C. voltage and having an output wherein the calculating means is also connected to the output of the A.C. voltage detector and the second calculation of the calculating means is additionally based on the output of the A.C. voltage detector.

* * * * *